United States Patent
Araghi et al.

(10) Patent No.: US 12,320,067 B2
(45) Date of Patent: Jun. 3, 2025

(54) POLYMER COATED PAPER RECYCLING PROCESS AND COMPOSITION

(71) Applicant: NANOCYCLE TECH INC., Ottawa (CA)

(72) Inventors: Meysam Araghi, Ottawa (CA); Alireza Naeimi Panjaki, Ottawa (CA); Behnam Rahmanloo, Ottawa (CA); Abdolkarim Sharifi, Ottawa (CA); Alireza Ghasemi, Ottawa (CA); Ghazal Asemian, Ottawa (CA); Ghazaleh Asemian, Ottawa (CA)

(73) Assignee: NANOCYCLE TECH INC., Ottawa (CA)

( * ) Notice: Subject to any disclaimer, the term of this patent is extended or adjusted under 35 U.S.C. 154(b) by 0 days.

(21) Appl. No.: 17/848,317

(22) Filed: Jun. 23, 2022

(65) Prior Publication Data
US 2022/0412003 A1 Dec. 29, 2022

Related U.S. Application Data

(60) Provisional application No. 63/213,888, filed on Jun. 23, 2021.

(51) Int. Cl.
| | |
|---|---|
| *D21C 5/02* | (2006.01) |
| *D21B 1/32* | (2006.01) |
| *D21C 3/20* | (2006.01) |
| *D21C 9/06* | (2006.01) |

(52) U.S. Cl.
CPC .............. *D21C 5/022* (2013.01); *D21C 3/20* (2013.01); *D21C 5/02* (2013.01); *D21C 9/06* (2013.01); *D21B 1/32* (2013.01); *Y02W 30/64* (2015.05)

(58) Field of Classification Search
CPC .................................. D21B 1/08; D21B 1/32
See application file for complete search history.

(56) References Cited

U.S. PATENT DOCUMENTS

| | | | | |
|---|---|---|---|---|
| 4,935,096 A | * | 6/1990 | Gallagher | D21C 5/027 162/158 |
| 5,316,621 A | * | 5/1994 | Kitao | D21D 5/00 162/6 |
| 5,665,204 A | * | 9/1997 | Rodriguez | D21C 9/02 162/4 |
| 2006/0011314 A1 | * | 1/2006 | Hertl | D21B 1/021 162/6 |
| 2017/0342233 A1 | | 11/2017 | De Oliveira | |

FOREIGN PATENT DOCUMENTS

| | | | |
|---|---|---|---|
| BR | 0202303 A | 5/2004 | |
| CA | 2777904 A1 * | 5/2011 | ............. D21C 5/025 |
| JP | 20000355670 A | 12/2000 | |
| JP | 2013057142 A * | 3/2013 | |

OTHER PUBLICATIONS

English Machine Translation of JP2013057142A (Year: 2013).*

* cited by examiner

*Primary Examiner* — Anthony Calandra

(57) ABSTRACT

The present invention provides a composition and process for preparing a depolymered paper product from polymer-coated paper waste, comprising the steps of treating shredded polymer-coated paper waste with a polymer removing composition comprising a mixture of a solvent component, a surfactant component, and an acidic component.

13 Claims, 1 Drawing Sheet

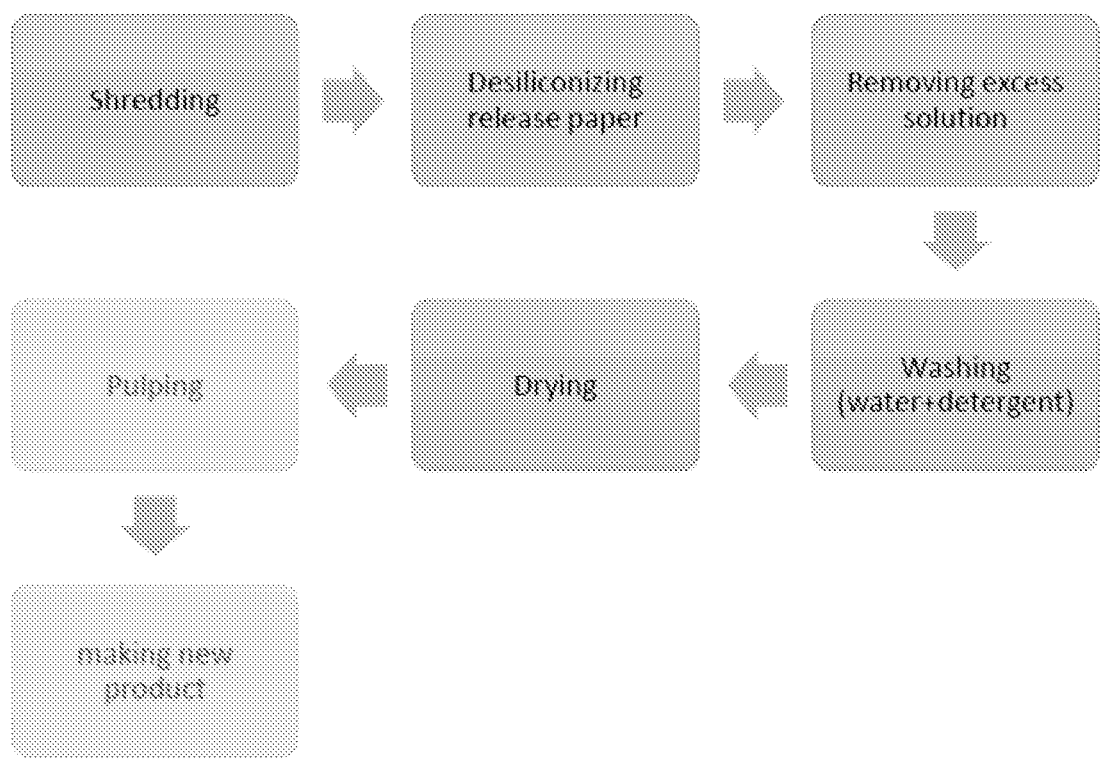

POLYMER COATED PAPER RECYCLING PROCESS AND COMPOSITION

FIELD OF THE INVENTION

The present invention pertains to the field of paper recycling processes and in particular to processes for recycling polymer-coated paper.

BACKGROUND

It is well known the paper production (likewise the other brands of industry) has enormous effects on the environment. The using and processing of raw materials has a variety of negative effects on the environment. The primary raw material for the paper production is pulps fibers obtaining by a complicated chemical process from natural materials, mainly from wood. This fibers production is very energy demanding and at the manufacturing process there are used many of the chemical matters which are very problematic from the viewpoint of environmental protection. The suitable alternative is obtaining the pulp fibers from already made paper. This process is far less demanding on energy and chemicals utilization. The paper recycling process, simplified, means repeated defibering, grinding and drying.

The recycling of paper is the process of producing new paper products from the waste paper, and has several remarkable benefits. Paper produced from recycled paper represents an energy saving of 70% compared to the energy needed to produce paper from wood or virgin fibers (more than glass). For every ton of recycled paper, the equivalent of 12 to 31 trees (4 $m^3$ of wood) is saved in wood. By recycling, the paper-cardboard industry could be supplied with almost 69% of the resources it needs. In addition, recycling paper saves 80% of water compared to production from virgin fiber, while also constituting a 74% reduction in gas emissions and a 35% reduction in water polluting emissions. Paper recycling also leads to reductions in greenhouse gas (GHG) emissions and diversion of waste from disposal in landfills or by incineration.

Among the main uses of these products are pressure-sensitive adhesives (PSA) including label stock, tapes, medical and hygiene applications, graphic arts, industrials goods, and building and insulation applications, etc. The worldwide production of release liner in 2010 was about 34 billion square meters (more than 2 million tons), with the PSA-label stock commanding more than 50% of the market share. Paper remains the main coating substrate with 85% of the global market share, compared to 15% for plastic films.

Silicone-based materials are currently the universal release agent used to produce release paper. The term "silicone" refers to a general category of synthetic polymers with a siloxane main chain made of repeating silicon to oxygen bonds. In addition, each silicon atom is bonded to organic groups, typically two methyl groups, in which case the material is called polydimethylsiloxane (PDMS). The simultaneous presence of organic groups attached to an inorganic backbone gives silicones a combination of unique properties such as high thermal and chemical stability (due to the siloxane main chain) associated with strong hydrophobic behavior and low surface free energy (due to methyl groups), making them ideal release agents. In addition, silicone polymers are liquid under normal conditions up to quite high polymerization degrees and show high wettability to almost all solid surfaces, a characteristic that facilitates the subsequent coating process.

Cured silicone films generally have a thickness of 1 to 2 µm, a basis weight of 1 to 2 $g/m^2$, and exhibit anti-tack properties against a wide range of adhesive formulations. The growing adoption of silicone release paper in automotive and building and construction industries is anticipated to drive the global silicone release paper market during forecast period. One sided coated silicone release paper dominates the global silicone release paper market.

The main drawback of using silicone as release agent is that it makes difficult the further recycling of paper substrate, thus losing a significant amount of high-quality fibers from the paper recycling stream.

Siliconized paper-based liners consist of high-quality wood fibers, which are very suitable for recycling. But the paper industry has historically regarded siliconized substrate as a problem due to the perception that silicone cannot effectively be dispersed in the de-inking process, leaving defects in the material structure.

Meanwhile, the stability of silicone polymers causes serious environmental problems in terms of paper substrate recyclability.

Independently of the requirements for reprocessing silicone-coated papers which is stipulated by law on the basis of waste regulations, there is a great interest on the part of the manufacturer of silicone papers in reprocessing the silicone papers, which are generally produced from high-grade fibrous materials.

There have therefore been previous attempts to improve the recyclability of silicone-coated papers by various aids. However, sheet formation was generally defective using prior art processes because of the incomplete dispersion of the fiber bundles. The dispersion of silicone-coated papers at temperatures above 100° C. and with the addition of alkali gave only a slight improvement; however, the recycled material was not to be used for producing the same type of paper.

EP-A 587 000 disclosed a process for recycling silicone-coated paper using salts of phosphoric acid esters of fluorinated alkanols.

U.S. Pat. No. 5,567,272 disclosed the use of salts of monophosphoric esters in amounts of 0.1 to 2.0% by weight based on silicone-coated paper wherein the disintegration is carried out at a temperature of 60° C. to 80° C. The main problem in this method is high temperature and also using sodium hydroxide which reduces fibers quality and thus paper quality in consequence.

Therefore there is a need for a process for recycling silicone-coated paper without disadvantages such as defective hydrapulping, high temperature, reduced fibers quality, incomplete resin dispersion, the formation of resin agglomerates, and the risk of sticking to cylinder surfaces and associated felts.

Another widely used paper product is paper cups, which are disposable cups made out of paper and often lined or coated with plastic or wax to prevent liquid from leaking out or soaking through the paper. It may be made of recycled paper and is widely used around the world.

Originally, paper cups for hot drinks were glued together and made waterproof by dropping a small amount of clay in the bottom of the cup, and then spinning at high speed so that clay would travel up the walls of the cup, making the paper water-resistant. However, this resulted in drinks smelling and tasting of cardboard.

Cups for cold drinks could not be treated in the same way, as condensation forms on the outside, then soaks into the board, making the cup unstable. To remedy this, cup manufacturers developed the technique of spraying both the inside and outside of the cup with wax. Clay- and wax-coated cups disappeared with the invention of polyethylene (PE)-coated cups; this process covers the surface of the board with a very thin layer of PE, waterproofing the board and welding the seams together.

The paperboard may be coated with a thin plastic, or polymeric, lining, which is needed for safety reasons: it acts as a barrier to ensure food hygiene and to make the cup liquid-proof. Plastic is a suitable lining material because of its strength, resilience and excellent barrier properties. It is also very good in terms of material, energy and cost efficiency.

For a cup to be suitable to be in contact with food, the paperboard or the lining cannot currently be made of recycled material.

Most paper cups are designed for a single use and then disposal. Very little recycled paper is used to make paper cups because of contamination concerns and regulations. Since most paper cups are coated with plastic (polyethylene), then both composting and recycling of paper cups is uncommon because of the difficulty in separating the polyethylene in the recycling process of said cups. As of 2016, there are only two facilities in the UK able to properly recycle PE-coated cups; in the absence of such facilities, the cups are taken to landfill or incinerated.

A study of one paper coffee cup with sleeve (16 ounce) shows that the CO2 emissions is about 0.253 kilograms (0.56 lb.) per cup with sleeve—including paper from trees, materials, production and shipping.

The habitat loss from one 16-ounce paper coffee cup with a sleeve is estimated to be 0.09 square meters (0.93 square feet. Over 6.5 million trees were cut down to make 16 billion paper coffee cups used by U.S. in 2006, using 4 billion US gallons (15,000,000 m3) of water and resulting in 253 million pounds (115,000,000 kg) of waste. Overall, Americans use 58% of all paper cups worldwide, amounting to 130 billion cups.

U.S. Pat. No. 5,084,135 disclosed a process to recycling plastic coated paper product waste that only works for polyethylene coated papers and not silicon release papers.

There is therefore a need for a process for recycling polymer coated papers that could also be used to recycle silicone-coated paper.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a polymer coated paper recycling process and composition. In accordance with an aspect of the present invention, there is provided a process for removing a polymer coating from polymer-coated paper waste to provide a depolymered paper product, comprising the steps of: providing shredded polymer-coated paper waste; combining the shredded polymer-coated paper waste with a polymer removing composition in a mixing tank to provide a mixture of the polymer-coated paper waste and the polymer removing composition, wherein the polymer removing composition comprises a mixture of a solvent component, a surfactant component, and an acidic component; reacting the mixture for a time sufficient to remove the polymer from the paper to provide a first depolymered paper product; removing excess polymer removing composition from the first depolymered paper product to provide a wet depolymered paper product; washing the wet depolymered paper product with a washing solution comprising water and detergent and/or a low boiling solvent to provide a washed depolymered paper product; and drying the washed depolymered paper product to provide the final paper product.

In accordance with another aspect of the present invention, there is provided a polymer removing composition for use in preparing a depolymered paper product from polymer-coated paper waste, wherein the polymer removing composition comprises from about 70 wt % to about 100 wt % of a solvent component, from about 0 wt % to about 15 wt % of a surfactant component, from about 0 wt % to about 20 wt % of an acidic component.

BRIEF DESCRIPTION OF THE FIGURES

FIG. 1 is a schematic depiction of a process for preparing a depolymered paper product, in accordance with one embodiment of the present invention.

DETAILED DESCRIPTION OF THE INVENTION

The term "polymer coated paper" is used herein to refer to a grade of paper having one or both sides being coated with a polymer in order to strengthen papers or give new properties. It includes polymer coated papers products such as coated paper cups, silicone release papers, and the like.

The term "release paper" is used herein to refer to a grade of paper having one or both sides being coated with a non-sticking material, or release agent, typically a silicone-based material. Release paper is typically used a backing paper for adhesive labels, self-adhesive films, self-adhesive tapes, and the like.

The term "silicone" is used herein to refer to a general category of synthetic polymers with a siloxane main chain made of repeating silicon to oxygen bonds, wherein each silicon atom is bonded to organic groups (such as methyl groups in polydimethylsiloxane (PDMS)). The term "silicone release agent" refers to the thin layer of silicone-based material coated on a paper substrate to provide a silicone-coated release paper product.

The term "depolymered paper" is used herein to refer to the paper product obtained after a polymer coating has been removed.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a process for removing a polymer coating from polymer-coated paper waste. The process is carried out by treating the coated paper waste with a polymer removing composition to remove the polymer layer in order to provide a depolymered paper product that can be recycled for use in preparing a new paper product. In one embodiment, the excess polymer removing composition removed from the depolymered paper may be recovered for re-use in further polymer removal steps. Recycling of the polymer removing composition thus minimizes the consumption and unnecessary waste of reagents and water resources used to prepare the polymer removing composition. In one embodiment, the polymer coating is a silicone polymer coating. In one embodiment, the polymer coating is a polyethylene coating.

In accordance with the present invention, the polymer removing step can advantageously be carried out under mild reaction conditions using a polymer removing composition. The use of mild reaction conditions minimizes the reduction in quality of the resulting fibers, thus maximizing the recovery and yield of useful fibers for use in a recycled paper product.

In a preferred embodiment, the first step in the process for preparing the depolymered paper product involves shredding the polymer-coated paper waste prior to treatment with the polymer removing composition. Accordingly, in one embodiment, the process starts with dry shredding the paper waste to a size suitable for mixing of the paper shred with the polymer removing composition. In one embodiment, the size of the shredded paper is between 5 mm to 50 cm, more preferably between 30 and 300 mm, most preferably between 80 and 150 mm. Shredding the paper to too small results in fiber damage that decreases the quality of the resulting depolymered paper, while large papers are hard to handle and mix. In the next step, shredded papers are entered into the mixing tank with a specific solution.

In one embodiment, the process comprises the step of combining the shredded polymer-coated paper waste with a polymer removing composition in a mixing tank to provide a mixture of the polymer-coated paper waste and the polymer removing composition In accordance with the present invention, the polymer removing composition comprises a mixture of a surfactant component, a solvent component, an acidic component with temperature between ambient and 95 degrees Celsius In one embodiment, the solvent component of the polymer removing composition comprises one or more solvents selected from acetone, hexane, mineral spirits, water, cyclohexane, naphtha, benzyl alcohol, isoparaffin, ethanol, isopropanol, toluene, xylene, pyridine, kerosene, and gasoline.

In one embodiment, the polymer removing composition comprises from about 70 wt % to about 100 wt %, preferably from about 70 wt % to about 98 wt %, more preferably about 90 wt %, of the solvent component.

In one embodiment, the surfactant component of the polymer removing composition comprises one or more surfactants. The surfactant component acts as an emulsifier of the solvents and the aqueous acidic components to ensure complete mixing of the de-siliconizing composition, while also facilitating removal of the polymer layer from the coated paper.

In one embodiment, the one or more surfactants are selected from sulfonic acid surfactants, sulfonate surfactants and sulfate surfactants.

In one embodiment, the surfactant component comprises sodium dodecyl sulfate, ammonium lauryl sulfate, sodium laureth sulfate, alkylbenzenesulfonic acid, methanesulfonic acid, or any combination thereof.

In one embodiment, the polymer removing composition comprises from about 0 wt % to about 15 wt %, preferably from about 0.5 wt % to about 15 wt %, more preferably from about 1 wt % to about 10 wt %, and yet more preferably from about 2 wt % to about 5 wt %, of the surfactant component.

In one embodiment, the polymer removing composition comprises an acidic component comprising one or more acids selected from sulfuric acid, acetic acid, hydrochloric acid, formic acid, citric acid, and nitric acid.

In a preferred embodiment, the acidic component comprises sulfuric acid.

In one embodiment, the polymer removing composition comprises from about 0 wt % to about 20 wt %, preferably from about 0.5 wt % to about 20 wt %, more preferably from about 0.5 wt % to about 2 wt %, of the acidic component.

In one embodiment, the process comprises the step of reacting the mixture for a time sufficient to remove the polymer from the paper to provide a first depolymered paper product.

In one embodiment, the shredded paper is placed in the polymer removing composition and mixed. In one embodiment, the mixing comprises mechanical agitation. Although optional, the mixing step can accelerate the polymer removal from the paper by up to 5 times faster than without mixing. It is, however, within the scope of the present invention that the reaction step be carried out without mixing.

In one embodiment, the step of reacting the mixture is carried out at ambient temperature and pressure. Care should be taken that all of the papers are maintained in contact with the polymer removing composition to ensure complete reaction.

In one embodiment, the step of reacting the mixture is carried out over a period of time from about 2 minutes to about 300 minutes.

After a sufficient reaction time, the depolymered paper product is ready to be removed from the composition. As the papers being treated can absorb up to about 100% of its weight of the solution, removal and recovery of the excess polymer removing composition is critical for reuse in subsequent polymer removal processes.

Accordingly, the process of the present invention also comprises the step of removing excess polymer removing composition from the depolymered paper product to provide a wet depolymered product. In one embodiment, the step of removing excess polymer removing composition is carried out by centrifugation. In one embodiment, the step of removing excess polymer removing composition comprises pressing the mixture to remove the solution.

In one embodiment, the step of removing excess polymer removing composition also comprises a drying step. In a preferred embodiment, the papers are dried under a vacuum and/or without applying heat in this step in order to be safe.

In a preferred embodiment, the step of removing excess polymer removing composition results in the removal and recovery of about 97 to 99% of the solution for reuse in the process.

The process of the present invention further comprises the step of washing the wet depolymered paper product with a washing solution comprising water and detergent and/or a low boiling solvent to provide a washed depolymered paper product. This step is carried out to remove the residual composition.

In one embodiment, the washing step is carried out at a temperature of from about 20° C. to about 95° C., preferably from about 50° C. to about 80° C., more preferably at a temperature of about 70° C. The use of relatively mild temperatures minimizes the energy requirements for carrying out the de-siliconizing process.

The washing step can be carried out with a washing solution comprising a mixture of water and detergent or a low boiling point solvent like acetone.

In one embodiment, the washing solution comprises from about 0.1 wt % to about 10 wt %, preferably from about 3 wt % to about 7 wt %, detergent in water. In one embodiment, the washing solution comprises water and acetone.

In one embodiment, if necessary, for example, if the removed polymer is not soluble in the polymer removing composition, the polymer separated from paper can be removed with flotation or filtration.

The resulting final, washed depolymered paper product can be used wet or dry to make a new sheet of paper or other types of cellulose-based materials.

In one embodiment, the process of the present invention further comprises the step of drying the washed depolymered paper product to provide the final depolymered paper product.

Although not required, the use of heat can speed up the drying step. In one embodiment, the step of drying takes place under vacuum. In one embodiment, the step of drying takes place under heating at a temperature of from about 60° C. to about 100° C.

In one embodiment, the drying step is carried out for a period of time of about 1 minute to about 2 hours.

In one embodiment, the degree of polymer removal of the paper product can be confirmed using FTIR methods to measure the amount of polymer layer present. The degree of water absorption of the resulting paper samples can also be measured at this stage.

The following Water Absorption Test Method is used to measure the water absorption of the paper sample. The method is based on the ASTM Standard Test Method for Rate of Water Absorption by Bibulous Papers (D 824). A test paper specimen is placed on a horizontal support centering the specimen over a 40-mm hole located in the support, ensuring that there is a gap of at least 10 mm beneath the center area of the paper specimen. Avoid stretching or distorting the test paper specimen, as this may change the results of the test. A dispensing device is filled with distilled or deionized water at 23° C.

The dispensing device is held at an angle of 30 or 45° to the horizontal with its tip nearly in contact with the central portion of the test paper specimen. Then in 6 seconds or less, a specified amount of water (1.0 mL) is dispensed onto the center of the paper specimen, while maintaining the tip of the dispensing device in contact with the water drop until delivery is completed.

The timer is started as soon as the water contacts the paper specimen and the time for the drop to be completely absorbed is measured to the nearest 0.2 seconds or better. Complete absorption is indicated by no further visual specular reflection of light (or the moment of disappearance of the glossy or shiny area from the wet spot). The maximum time course for a test is 120 seconds. Based on the time required for complete absorbance of the water, or a determination of incomplete absorbance at time 120 seconds, each sample is assigned a value from 0 to 5, where a value of 5 is assigned for a sample for which the time required for complete absorbance is similar to a paper sample without coating and a value of 1 is assigned for a sample for which the water is not completely absorbed in 120 seconds. The test is conducted under conditions that avoid heating from external sources such as a light and exposure to air currents that might influence the test.

Accordingly, the method of the present invention can be conducted under ambient temperature and pressure conditions and does not require complicated instrumentation or apparatuses.

The invention will now be described with reference to specific examples. It will be understood that the following examples are intended to describe embodiments of the invention and are not intended to limit the invention in any way.

EXAMPLES

Example 1: Removal of Release Layer with Single Solvents

Shredded silicone coated release papers (100 grams) are added to a mixing vessel containing 500 grams of a polymer removing composition containing 470 g of a solvent as identified in the first column of Table 1, 15 g of sodium dodecyl sulfate (SDS) surfactant, and 15 g of sulfuric acid (98%). All components are mixed with an overhead mixer for 50 minutes, at a temperature of 30° C. followed by centrifugation of the mixture for 5 minutes at 2000 rpm to dry the treated papers and recover the solution. In the next stage, the treated papers are washed with 500 grams of water containing detergent for 30 minutes to remove any remaining polymer removing composition and silicone residue. Filtration was carried out to remove the paper residue from the wash solution.

After the washing step is completed, and the resulting paper samples are dried, the treated paper samples are tested for water absorption using the Water Absorption Test Method described herein, and assigned a value from 1 to 5.

It is apparent from the results reported in Table 1 that some solvents result in treated papers having a higher water absorption value. It was also determined that, when the water absorption test value is below 3, an FTIR test also shows the presence of some silicon residue. However, all of these resulting samples of treated paper can be pulped for making new paper product.

All percentages used in examples are weight percentages.

TABLE 1

| Solvent | Surfactant | Acidic solution | Washing solution | Water absorption test |
|---|---|---|---|---|
| Xylene | SDS | Sulfuric acid | Water + 5% detergent | 5 |
| Ethanol | SDS | Sulfuric acid | Water + 5% detergent | 4 |
| Pyridine | SDS | Sulfuric acid | Water + 5% detergent | 3 |
| Kerosene | SDS | Sulfuric acid | Water + 5% detergent | 5 |
| Acetone | SDS | Sulfuric acid | Water + 5% detergent | 4 |
| Hexane | SDS | Sulfuric acid | Water + 5% detergent | 5 |
| Mineral Spirits | SDS | Sulfuric acid | Water + 5% detergent | 5 |
| Cyclohexane | SDS | Sulfuric acid | Water + 5% detergent | 3 |
| Isopropanol | SDS | Sulfuric acid | Water + 5% detergent | 4 |
| Naphtha | SDS | Sulfuric acid | Water + 5% detergent | 5 |
| Benzyl alcohol | SDS | Sulfuric acid | Water + 5% detergent | 4 |
| Gasoline | SDS | Sulfuric acid | Water + 5% detergent | 5 |
| Isoparaffin | SDS | Sulfuric acid | Water + 5% detergent | 2 |
| Water | SDS | Sulfuric acid | Water + 5% detergent | 2 |

Example 2: Removal of Release Layer with Solvent Mixtures

The polymer removal process for this example is carried out under the same steps and conditions as described in Example 1, but using the solvent mixture set out in the first column of Table 2. The test results are reported in Table 2.

TABLE 2

| Solvent | Surfactant | Acidic solution | Washing solution | Water absorption test |
|---|---|---|---|---|
| Xylene/Ethanol | SDS | Sulfuric acid | Water + 5% detergent | 5 |
| Acetone/Pyridine | SDS | Sulfuric acid | Water + 5% detergent | 5 |
| Kerosene/Gasoline | SDS | Sulfuric acid | Water + 5% detergent | 5 |
| Mineral Spirits/Hexane | SDS | Sulfuric acid | Water + 5% detergent | 5 |
| Naphtha/Isopropanol | SDS | Sulfuric acid | Water + 5% detergent | 5 |
| Gasoline/Acetone | SDS | Sulfuric acid | Water + 5% detergent | 5 |
| Kerosene/Gasoline/Acetone | SDS | Sulfuric acid | Water + 5% detergent | 5 |
| Water/Ethanol | SDS | Sulfuric acid | Water + 5% detergent | 3 |

Example 3: Effectiveness of Different Surfactants

Shredded silicone coated release papers (100 grams) are added to a mixing vessel containing 500 grams of a polymer removing composition containing 470 g of kerosene, 15 g of a surfactant as identified in the second column of Table 3, and 15 g of sulfuric acid (98%). The remaining steps of the process are as carried out in Example 1. The test results are reported in Table 3.

As shown in Table 3, all of examples that employed surfactants are effective and the results of the water absorption test show very good removal of the polymer layer.

TABLE 3

| Solvent | Surfactant | Acidic solution | Washing solution | Water absorption test |
|---|---|---|---|---|
| Kerosene | SDS | Sulfuric acid | Water + 5% detergent | 5 |
| Kerosene | ALS | Sulfuric acid | Water + 5% detergent | 5 |
| Kerosene | SLES | Sulfuric acid | Water + 5% detergent | 5 |
| Kerosene | alkyl-benzenesulfonic acid | Sulfuric acid | Water + 5% detergent | 5 |
| Kerosene | Methanesulfonic acid (70% aqueous solution) | Sulfuric acid | Water + 5% detergent | 5 |
| Kerosene | Without surfactant | Sulfuric acid | Water + 5% detergent | 2 |
| Kerosene | SDS/SLES (1:1 mixture) | Sulfuric acid | Water + 5% detergent | 5 |
| Kerosene | SDS/alkyl-benzenesulfonic acid (1:1 mixture) | Sulfuric acid | Water + 5% detergent | 5 |

Example 4: Effectiveness of Different Acids

Shredded silicone coated release papers (100 grams) are added to a mixing vessel containing 500 grams of a polymer removing composition containing 470 g of kerosene, 15 g of SDS surfactant, and 15 g of an acidic solution comprising the acid as identified in the third column of Table 4. The remaining steps of the process are as carried out in Example 1. The stock acidic solutions employed in this example are sulfuric acid 98%, hydrochloric acid 37%, glacial acetic acid, nitric acid 68%, and citric acid aqueous solution (50% w/w). The test results are reported in Table 4.

TABLE 4

| Solvent | surfactant | Acidic solution | Washing solution | Water absorption test |
|---|---|---|---|---|
| Kerosene | SDS | Sulfuric acid | Water + 5% detergent | 5 |
| Kerosene | SDS | Acetic Acid | Water + 5% detergent | 4 |
| Kerosene | SDS | Hydrochloric acid | Water + 5% detergent | 4 |
| Kerosene | SDS | Nitric Acid | Water + 5% detergent | 3 |
| Kerosene | SDS | Sulfuric acid/Acetic Acid (1:1 mixture) | Water + 5% detergent | 5 |
| Kerosene | SDS | Sulfuric acid | Water + 5% detergent | 2 |
| Kerosene | SDS | Sulfuric acid | Water + 5% detergent | 5 |
| Kerosene | SDS | Sulfuric acid | Water + 5% detergent | 5 |

Example 5: Effect of Varying Concentration of Acidic Solution

Shredded silicone coated release papers (100 grams) are added to a mixing vessel containing 500 grams of a polymer removing composition containing 15 g SDS surfactant, sulfuric acid (98%) in the amount identified in the third column in Table 5, and the balance being kerosene. The remaining steps of the process are as carried out in Example 1. The test results are reported in Table 5.

It is apparent from the water absorption test that the best results are achieved when the polymer removing composition comprised greater than 2 wt % and less than 10 wt % of sulfuric acid. More than 10 wt % resulted in a degradation and damaged to the paper fibers.

TABLE 5

| Solvent | Surfactant | Acidic solution | Washing solution | Water absorption test |
|---|---|---|---|---|
| Kerosene | SDS | Sulfuric acid 0.1% | Water + 5% detergent | 2 |
| Kerosene | SDS | Sulfuric acid 0.4% | Water + 5% detergent | 3 |
| Kerosene | SDS | Sulfuric acid 1% | Water + 5% detergent | 4 |
| Kerosene | SDS | Sulfuric acid 2% | Water + 5% detergent | 5 |
| Kerosene | SDS | Sulfuric acid 3% | Water + 5% detergent | 5 |
| Kerosene | SDS | Sulfuric acid 5% | Water + 5% detergent | 5 |
| Kerosene | SDS | Sulfuric acid 10% | Water + 5% detergent | 5 |
| Kerosene | SDS | Sulfuric acid 20% | Water + 5% detergent | 5 |

Example 6: Varying Concentration of Surfactant Solution

Shredded silicone coated release papers (100 grams) are added to a mixing vessel containing 500 grams of a polymer removing composition containing 15 g sulfuric acid (98%), SDS surfactant in the amount identified in the second column in Table 6, and the balance being kerosene. The remaining steps of the process are as carried out in Example 1. The test results are reported in Table 6.

The water absorption test shows that a polymer removing composition comprising more than 2 wt % removes the release coat well, but amounts greater than that it did not result in further improvements in removal of the release layer. Once the amount of surfactant reaches 10 wt %, the washing step becomes more difficult because of removing surfactant takes more time.

TABLE 6

| Solvent | Surfactant | Acidic solution | Washing solution | Water absorption test |
|---|---|---|---|---|
| Kerosene | SDS 0.001% | Sulfuric acid | Water + 5% detergent | 2 |
| Kerosene | SDS 0.4% | Sulfuric acid | Water + 5% detergent | 3 |
| Kerosene | SDS 1% | Sulfuric acid | Water + 5% detergent | 4 |
| Kerosene | SDS 2% | Sulfuric acid | Water + 5% detergent | 5 |
| Kerosene | SDS 3% | Sulfuric acid | Water + 5% detergent | 5 |
| Kerosene | SDS 5% | Sulfuric acid | Water + 5% detergent | 5 |
| Kerosene | SDS 10% | Sulfuric acid | Water + 5% detergent | 5 |
| Kerosene | SDS 20% | Sulfuric acid | Water + 5% detergent | 5 |

Example 7: Effect of Changing Temperature of Solution

Shredded silicone polymer coated papers (100 grams) are added to a mixing vessel containing 500 grams of a polymer removing composition containing 15 g sulfuric acid (98%), 15 g of sodium dodecyl sulfate (SDS) surfactant and the balance being the solvent identified in the first column of Table 7. The reaction temperature is varied according to the second column of Table 7. The remaining steps of the process are as carried out in Example 1. The test results are reported in Table 7.

The water absorption test shows that a polymer removing composition in kerosene is not temperature dependent but in water with increasing temperature water absorption increased and in 95° C. very good removal occurred.

TABLE 7

| Solvent | Temperature ° C. | Surfactant | Acidic solution | Washing solution | Water absorption test |
|---|---|---|---|---|---|
| Kerosene | 25 | SDS | Sulfuric acid | Water + 5% detergent | 5 |
| Kerosene | 30 | SDS | Sulfuric acid | Water + 5% detergent | 5 |
| Kerosene | 40 | SDS | Sulfuric acid | Water + 5% detergent | 5 |
| Water | 40 | SDS | Sulfuric acid | Water + 5% detergent | 2 |
| Kerosene | 50 | SDS | Sulfuric acid | Water + 5% detergent | 5 |
| Kerosene | 60 | SDS | Sulfuric acid | Water + 5% detergent | 5 |
| Kerosene | 70 | SDS | Sulfuric acid | Water + 5% detergent | 5 |
| Water | 70 | SDS | Sulfuric acid | Water + 5% detergent | 4 |
| Kerosene | 95 | SDS | Sulfuric acid | Water + 5% detergent | 5 |
| Water | 95 | SDS | Sulfuric acid | Water + 5% detergent | 5 |

Example 8: Effect of Varying Concentration of Acidic Solution for Coffee Cup Papers Shredded coffee cup papers (100 grams, coated with polyethylene) are added to a mixing vessel containing 500 grams of a polymer removing composition containing sulfuric acid (98%) in the amount identified in the third column in Table 8, 10 grams of sodium dodecyl sulfate (SDS) as surfactant and the balance being kerosene. Reaction temperature was set to 50° C. The remaining steps of the process are as carried out in Example 1. The test results are reported in Table 8.

It is apparent from the water absorption test that the best results are achieved when the composition comprised greater than 0.5 wt % and less than 2 wt % of sulfuric acid. More than 10 wt % resulted in a degradation and damage to the paper fibers.

TABLE 8

| Solvent | Acidic solution | Surfactant | Washing solution | Water absorption test |
|---|---|---|---|---|
| Kerosene | Sulfuric acid 0.1% | SDS | Water + 5% detergent | 3 |
| Kerosene | Sulfuric acid 0.2% | SDS | Water + 5% detergent | 4 |
| Kerosene | Sulfuric acid 0.5% | SDS | Water + 5% detergent | 5 |
| Kerosene | Sulfuric acid 1% | SDS | Water + 5% detergent | 5 |
| Kerosene | Sulfuric acid 2% | SDS | Water + 5% detergent | 5 |
| Kerosene | Sulfuric acid 5% | SDS | Water + 5% detergent | 5 |
| Kerosene | Sulfuric acid 10% | SDS | Water + 5% detergent | 5 |

Example 9: Effectiveness of Different Acids for Coffee Cup Papers

Shredded coffee cup papers (100 grams, polyethylene coated) are added to a mixing vessel containing 500 grams of a composition containing 485 g of kerosene, 10 grams of sodium dodecyl sulfate (SDS) as surfactant and 5 g of an acidic solution comprising the acid as identified in the second column of Table 9. Reaction temperature was set to 50° C. The remaining steps of the process are as carried out in Example 1. The stock acidic solutions employed in this example are sulfuric acid 98%, hydrochloric acid 37%, nitric acid 68% and glacial acetic acid. The test results are reported in Table 9.

TABLE 9

| Solvent | Acidic solution | Surfactant | Washing solution | Water absorption test |
|---|---|---|---|---|
| Kerosene | Sulfuric acid | SDS | Water + 5% detergent | 5 |
| Kerosene | Hydrochloric acid | SDS | Water + 5% detergent | 3 |
| Kerosene | Nitric Acid | SDS | Water + 5% detergent | 3 |
| Kerosene | Acetic acid | SDS | Water + 5% detergent | 4 |

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A process for removing a polymer coating from polymer-coated paper waste to provide a depolymered paper product, comprising the steps of:
    providing shredded polymer-coated paper waste;
    combining the shredded polymer-coated paper waste with a polymer removing composition in a mixing tank to provide a mixture of the polymer-coated paper waste and the polymer removing composition, wherein the polymer removing composition comprises:
        from about 70 wt % to about 98 wt % of a solvent component comprising one or more solvents selected from acetone, hexane, mineral spirits, water, cyclohexane, naphtha, benzyl alcohol, isoparaffin, ethanol, isopropanol, toluene, xylene, pyridine, kerosene, and gasoline,
        from about 0.5 wt % to about 15 wt % of a surfactant component comprising one or more surfactants selected from sulfonic acid surfactants, sulfonate surfactants and sulfate surfactant, and
        from about 0.5 wt % to about 20 wt % of an acidic component comprising one or more acids selected from sulfuric acid, acetic acid, hydrochloric acid, formic acid, citric acid, and nitric acid;
    reacting the mixture for a time sufficient to remove the polymer from the paper to provide a first depolymered paper product;
    removing excess polymer removing composition from the first depolymered paper product to provide a wet depolymered paper product;
    washing the wet depolymered paper product with a washing solution comprising water and detergent and/or a low boiling solvent to provide a washed depolymered paper product; and
    drying the washed depolymered paper product to provide the final paper product.

2. The process of claim 1, wherein the polymer-coated paper waste is silicone release paper, polymer coated paper cups, or a combination of both.

3. The process of claim 2, wherein the polymer coated paper cups are polyethylene coated paper cups.

4. The process of claim 3, further comprising a flotation or filtration step to remove the polymer separated from the first depolymered paper product.

5. The process of claim 4, wherein the polymer removing composition comprises about 90 wt % of the solvent component.

6. The process of claim 5, wherein the polymer removing composition comprises from about 1 wt % to about 10 wt % or about 2 wt % to about 5 wt %, of the surfactant component.

7. The process of claim 6, wherein the surfactant component comprises sodium dodecyl sulfate, ammonium lauryl sulfate, sodium laureth sulfate, alkylbenzenesulfonic acid, methanesulfonic acid or any combination thereof.

8. The process of claim 7, wherein the polymer removing composition comprises from about 0.5 wt % to about 2 wt % of the acidic component.

9. The process of claim 8, wherein the step of reacting the mixture is carried out at temperature between 25 to 100° C., and the step of washing is carried out at a temperature of from about 20° C. to about 95° C. or at a temperature of from about 50° C. to about 80° C.

10. The process of claim 9, wherein the step of reacting the mixture is carried out over a period of time from about 2 minutes to about 300 minutes.

11. The process of claim 10, wherein the step of reacting the mixture comprises mechanical agitation of the mixture.

12. The process of claim 11, wherein the step of removing excess polymer removing composition is carried out by centrifugation or by pressing the mixture to remove the composition.

13. The process of claim 1, wherein the polymer removing composition comprises 81 wt % kerosene, 15 wt % xylene, 1.5 wt % sulfuric acid, 0.5 wt % nitric acid, 1 wt % sodium dodecyl sulfate (SDS), 0.5 wt % ammonium lauryl sulfate (ALS), and 0.5 wt % methanesulfonic acid.

* * * * *